US007581843B2

(12) United States Patent
Stauner

(10) Patent No.: US 7,581,843 B2
(45) Date of Patent: Sep. 1, 2009

(54) ELECTRICAL FIXTURE ASSEMBLY ADAPTED TO BE MODIFIED TO COMPLY TO A POWER USAGE LIMIT

(76) Inventor: Joseph Stauner, 725 Oakview Dr., Algonquin, IL (US) 60102

( * ) Notice: Subject to any disclaimer, the term of this patent is extended or adjusted under 35 U.S.C. 154(b) by 279 days.

(21) Appl. No.: 11/421,906

(22) Filed: Jun. 2, 2006

(65) Prior Publication Data

US 2007/0279221 A1 Dec. 6, 2007

(51) Int. Cl.
*F21V 33/00* (2006.01)
*B32B 33/00* (2006.01)

(52) U.S. Cl. .......................... 362/85; 428/42.2; 283/81; 283/101; 40/638; 340/691.6; 340/662

(58) Field of Classification Search ................... 362/20, 362/85; 340/572.3, 636.15, 660, 662, 691.6, 340/815.4; 40/630, 638, 675; 283/81, 101, 283/108; 428/42.2
See application file for complete search history.

(56) References Cited

U.S. PATENT DOCUMENTS 4,983,438 A * 1/1991 Jameson .................... 428/42.3
5,207,458 A * 5/1993 Treichel et al. ............... 283/81
6,159,569 A * 12/2000 Hansen ...................... 428/40.1
6,251,212 B1 * 6/2001 Moh et al. ............... 156/308.2
6,635,333 B2 * 10/2003 Grigg et al. ................. 428/134
6,731,221 B1 * 5/2004 Dioshongh et al. ....... 340/691.6
6,929,837 B2 * 8/2005 Morrison .................. 428/40.1

* cited by examiner

*Primary Examiner*—Stephen F Husar
*Assistant Examiner*—Peggy A. Neils

(57) ABSTRACT

An electrical fixture assembly is provided that is adapted to be modified to comply with a power usage limit assigned to the electrical fixture for operation in a circuit. The electrical fixture assembly has a surface and a label adapted to be applied to the surface. The label has a plurality of sections. Each section identifies a respective one of a plurality of power usage limits for operating the electrical fixture in a circuit. At least one of the sections is adapted to be removed from the label when the power usage limit identified by the at least one of the sections exceeds another power usage limit associated with the electrical fixture when installed in the circuit.

18 Claims, 5 Drawing Sheets

Fig. 4

400

402 404 406

| | TRIM NO. | MAX. LAMP WATTS & TYPE | | |
|---|---|---|---|---|
| | 242 | 45W PAR38 | | |
| | 228,248 | 50W R20/PAR20 | | |
| | 24,25,27,264,267,9024 9324,9524,9702 | 50W PAR30 | 440 | 450 |
| | 241,V3034,V3037,V3041 | 40W A19 | | |
| | 28,29,229,249,247, V3024,V3025 V3029,V3034,V3037,XR30101 | 50W PAR30 | 75W PAR30 | |
| | 24,27,28,29,229,244,247,249 9024,9324,9524,9702,V3024 V3025,V3029,V3034,V3037 | 50W PAR30L | 75W PAR30L | |
| | V3025 | 50W PAR38 | 75W PAR38 | |
| | 226 432 | 50W PAR16 | 75W PAR16 416 | |
| | 28,29,V3024,V3037 | 50W PAR38 | 75W PAR38 | 90W PAR38 418 |
| | 24,25,27,28,29,229,244,247, 249,250,252,9024,9324,9524, 9702,V3024,V3025,V3029 V3034,V3037 | 426 420 414 50W BR30 | 428 422 65W BR30 | 430 424 |
| | 28,29,V3034,V3037 | 50W BR40 | 75W BR40 | 90W BR40 |
| | 244 | 50W BR30 | 60W PAR30 | |
| | 28,29,231 | 50W A19 | 60W A19 | |
| | | 50 WATT | 75 WATT | 90 WATT |

408 410 470 412 472

ELECTRICAL FIXTURE ASSEMBLY ADAPTED TO BE MODIFIED TO COMPLY TO A POWER USAGE LIMIT

FIELD OF THE INVENTION

The invention relates to an electrical fixture and, more particularly, to an electrical fixture (such as a lighting fixture) adapted to be modified to comply to a power usage limit associated with a power distribution circuit branch and to designing a circuit load with one or more of the aforementioned electrical fixtures.

BACKGROUND OF THE INVENTION

An electrical lighting fixture (i.e., a track lighting fixture, a recessed lighting fixture, or other lighting fixture for installation in a room) must be labeled to show the lamp types and maximum wattage allowed for safe operation of the lighting fixture in accordance with the listing requirements specified by one or more testing and compliance agencies, such as Underwriters Laboratories, Inc., Canadian Standards Association, and ETL Testing Laboratories. A conventional fixture suitable for use in a track lighting system or a recessed lighting system often has multiple lamps and various wattages listed for use in the respective fixture. In addition, with respect to recessed lighting fixtures, one or more varieties of trim styles are typically listed to be used in conjunction with the respective recessed lighting fixture. Each trim style may have the ability to operate with a variety of lamp types and varying wattages. In accordance with testing and compliance agency requirements, the trim style, lamp type, and lamp wattage information for a lighting fixture must be clearly identified on the lighting fixture and visible to the installer, inspector and end user. Conventional lighting fixtures typically have this information printed on one label affixed to the respective fixture and in a format required to comply with the listing standards of any one of the authorized testing and compliance agencies. Once the conventional lighting fixture is installed, the one label provides the guidelines for the specific lamp types and associated wattage ratings that may be used in the fixture to operate safely in compliance with the applicable lighting standard of the agency that approved the use of the fixture.

In addition to lighting fixture standards for safe operation, existing energy codes (e.g., American Society of Heating, Refrigerating & Air Conditioning Engineers Energy Standard, California's Energy Efficiency Standards for Residential and Non-residential Buildings, and other state energy standards) have been revised, along with the introduction of new energy codes which address the maximum allowable wattage per fixture/circuit combination for a prescribed commercial facility. (i.e. whole building or defined space). Formulas such as Unit Power Density (UPD) or Watt/ft2 were created to control the maximum allowable wattage per space or building. Different wattage allowance were applied to, but not limited to, specific spaces, such as commercial offices, hospitals, retail buildings, and manufacturing facilities. At the time of final inspection, the maximum wattage rating for each lighting fixture (which may not correspond to the wattage of the lamp installed in the fixture) is identified by the inspector as the applicable power limit to verify the lighting fixture is installed in compliance with the applicable energy code. This method of energy code compliance verification was adopted in most states based on the fact that the end user could, after the initial inspection was performed to verify the applicable power level for a fixture, replace a lower wattage rated lamp currently installed in the fixture with another lamp having the maximum wattage identified on the one label affixed to the fixture, violating the requirements of the applicable energy code. Assessing the power level limit for energy consumption based on the lighting fixtures maximum wattage rating has caused building lighting designers to request properly labeled lighting fixtures for new and remodeled buildings in accordance with the applicable energy codes. In response to these requests, electrical contractors typically order specially labeled lighting fixtures to denote the designed power limit or new maximum wattage rating for the respective fixture. As a result, lighting manufacturers often are required to make low volumes of specially labeled lighting fixtures having different maximum wattages, resulting in manufacturing efficiency problems and increased inventories of fixtures that increases the cost of manufacturing. Manufacturers of other electrical fixtures, such as room exhaust fans, ceiling fans, and heating fixtures, have experienced similar problems.

Therefore, a need exists for an electrical fixture assembly that overcomes the problems noted above and others previously experienced for modifying an electrical fixture, such as a lighting fixture, to comply with a power usage limit associated with an energy code requirement. These and other needs addressed by an electrical fixture consistent with the present invention will become apparent to those of skill in the art after reading the present specification.

SUMMARY OF THE INVENTION

The foregoing problems are solved and a technical advance is achieved by the present invention. In accordance with articles of manufacture consistent with the present invention, an electrical fixture assembly is provided. The electrical fixture assembly comprises an electrical fixture having a surface, and a label adapted to be applied to the surface. The label has a plurality of sections. Each section identifies a respective one of a plurality of power usage limits for operating the electrical fixture in a circuit. At least one of the sections is adapted to be removed from the label when the power usage limit identified by the respective section exceeds another power usage limit associated with the electrical fixture when installed in the circuit. In one implementation, the label is visible to a user when the label is applied to the surface and the electrical fixture assembly is installed in the circuit.

In accordance with methods consistent with the present invention, a method is provided for modifying an electrical fixture to comply with a power usage limit assigned to the electrical fixture for operation in a circuit. The method comprises associating a label with the electrical fixture. The label has a plurality of sections. Each section identifies a respective one of a plurality of power usage limits for the lighting fixture. The method further comprises removing from the label each section identifying a respective one of the power usage limits that exceeds the power usage limit assigned to the electrical fixture.

In accordance with articles of manufacture consistent with the present invention, a lighting fixture assembly is provided. The lighting fixture has a surface, and a label adapted to be applied to the surface. The label has a plurality of sections. Each section identifies a respective one of a plurality of power usage limits for operating the lighting fixture in a circuit. Each section except for a first section is adapted to be removed from the label when the power usage limit identified by the respective section exceeds another power usage limit associated with the lighting fixture when installed in the circuit.

Other systems, assemblies, methods, features, and advantages of the present invention will be or will become apparent to one with skill in the art upon examination of the following figures and detailed description. It is intended that all such additional systems, assemblies, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 4 depicts another embodiment of a label suitable for use with each of the electrical fixture assemblies shown in FIGS. 1, 2A, 2B, and 2C to enable the respective fixture assembly to be modified to comply with a respective power usage limit in accordance with the present invention.

DETAILED DESCRIPTION OF THE INVENTION

Figure 1:
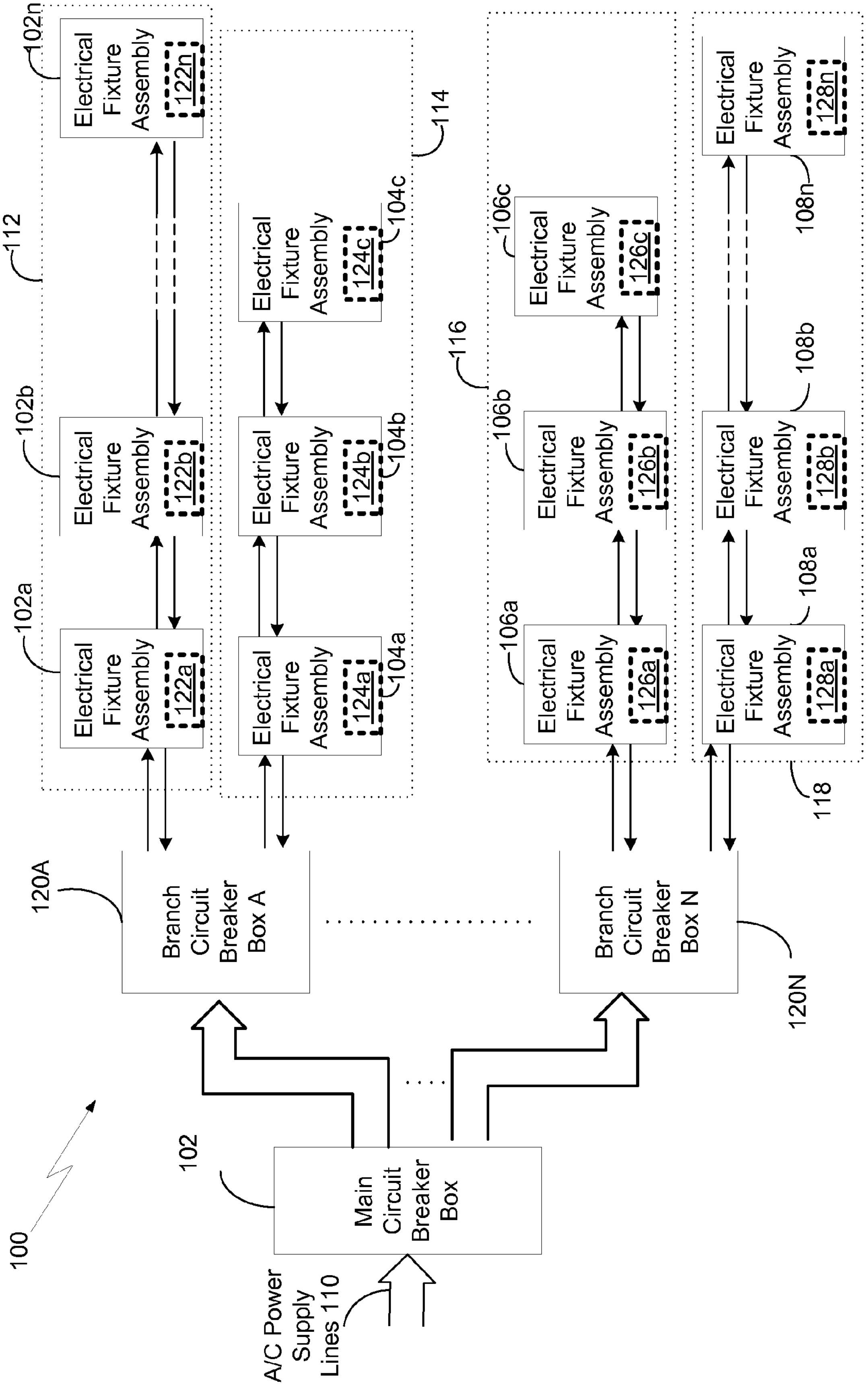
FIG. 1 is a block diagram depicting an electrical power distribution system having one or more electrical fixture assemblies, each adapted to be modified to comply with a respective power usage limit in accordance with the present invention.

As described above, compliance agencies and energy codes identify maximum allowable power usage limit or wattage per electrical fixture in a distribution branch circuit for a prescribed commercial facility (i.e., an entire building, or a defined space or room within the building). FIG. 1 depicts an exemplary electrical power distribution system 100 having one or more electrical fixture assemblies 102_a_-102_n_, 104_a_-104_c_, 106_a_-106_c_, and 108_a_-108_n_, each adapted to be modified to comply with a respective power usage limit in accordance with the present invention. The electrical power distribution system 100 may be implemented in a commercial building, a residential home, or other facility in accordance with applicable state or local electrical and energy codes. The electrical power distribution system 100 includes a main circuit breaker box 102 that distributes electrical power received from A/C power supply lines 104 to one or more branch circuits 112, 114, 116, or 118 (either directly or via one or more branch circuit breaker boxes 120A-120N) in accordance with an electrical distribution plan for the facility implementing the power distribution system 100. The electrical distribution plan for the facility may be prepared in whole or in part by an architect, a lighting designer, or other person adept at specifying electrical fixture types (e.g., types of lighting fixtures, ceiling fans, exhaust fans, heating fixtures, or other electrical fixtures) and corresponding locations within a facility in accordance with state, local, or other applicable electrical or energy codes or standards.

To comply with such codes or standards, each branch circuit 112, 114, 116, and 118 may have a respective maximum power usage limit (e.g., 200 Amps or 24 KWatts for 120 VAC service). In this implementation, to comply with the maximum power usage limit for a branch circuit, each electrical fixture assembly 102_a_-102_n_, 104_a_-104_c_, 106_a_-106_c_, or 108_a_-108_n_ planned for and installed in the respective branch circuit 112, 114, 116, and 118 is assigned a corresponding power usage limit that is a fraction (e.g., 50 Watt, 75 Watt, or 90 Watt) of the maximum power usage limit of the respective branch circuit. As described in further detail below, each electrical fixture assembly 102_a_-102_n_, 104_a_-104_c_, 106_a_-106_c_, or 108_a_-108_n_ in each branch circuit 102_a_-102_n_, 104_a_-104_c_, 106_a_-106_c_, or 108_a_-108_n_ has a respective label 122_a_-122_n_, 124_a_-124_c_, 126_a_-126_c_, or 128_a_-128_n_ that is adapted to be modified to enable the electrical fixture assembly 102_a_-102_n_, 104_a_-104_c_, 106_a_-106_c_, or 108_a_-108_n_ to comply to its assigned power usage limit upon installation in the respective branch circuit 112, 114, 116, or 118. Accordingly, electrical fixture assemblies consistent with the present invention enable manufacturers (e.g., lighting manufacturers) to produce an electrical fixture 102_a_-102_n_, 104_a_-104_c_, 106_a_-106_c_, or 108_a_-108_n_ adapted to be modified upon installation to comply with various assigned power usage limits and to avoid producing low volumes of special ordered labeled electrical fixtures each having a different maximum wattage or power usage limit. In addition, electrical fixture assemblies consistent with the present invention enable an architect, a lighting designer, or other person familiar with circuit loading to select the type and number of electrical fixture assemblies 102_a_-102_n_, 104_a_-104_c_, 106_a_-106_c_, or 108_a_-108_n_ for a respective branch circuit 112, 114, 116, or 118 based on the assigned maximum power usage limit (e.g., 200 Amps or 24 KWatts for 120 VAC service) of the branch circuit, assign a corresponding power usage limit to each selected electrical fixture assembly in accordance with the assigned maximum power usage limit of the branch circuit 112, 114, 116, or 118, and then modify (or have modified) each label 122_a_-122_n_, 124_a_-124_c_, 126_a_-126_c_, or 128_a_-128_n_ to enable the respective electrical fixture assembly 102_a_-102_n_, 104_a_-104_c_, 106_a_-106_c_, or 108_a_-108_n_ to comply to its assigned power usage limit upon installation in the respective branch circuit 112, 114, 116, or 118.

Figures 2A, 2B, 2C:
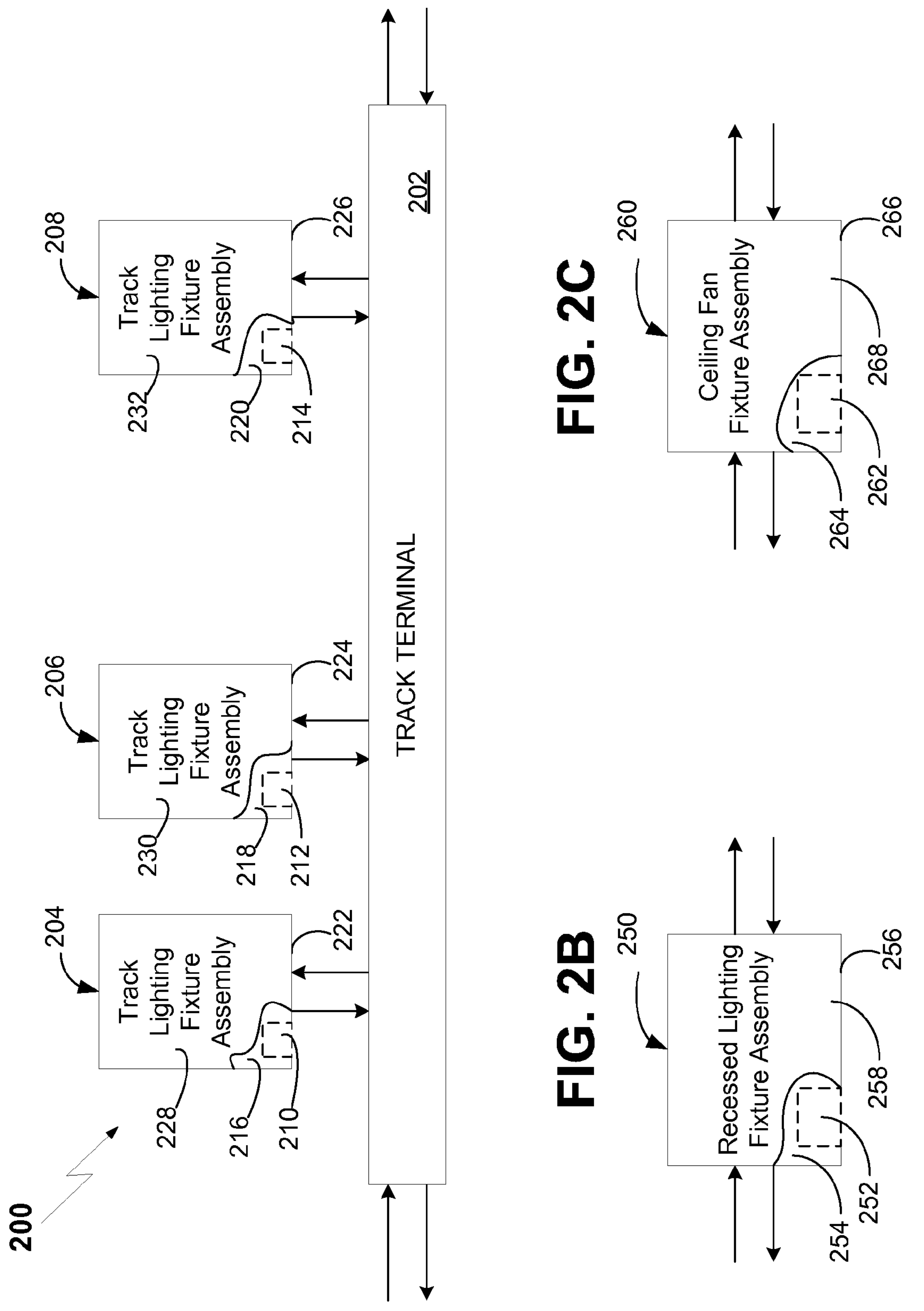
FIG. 2A is a block diagram depicting one embodiment of an electrical fixture assembly in FIG. 1 adapted to be modified to comply with a respective power usage limit in accordance with the present invention.
FIG. 2B is a block diagram depicting another embodiment of an electrical fixture assembly in FIG. 1 adapted to be modified to comply with a respective power usage limit in accordance with the present invention.
FIG. 2C is a block diagram depicting another embodiment of an electrical fixture assembly in FIG. 1 adapted to be modified to comply with a respective power usage limit in accordance with the present invention.

Each electrical fixture assembly 102_a_-102_n_, 104_a_-104_c_, 106_a_-106_c_, or 108_a_-108_n_ may be a lighting fixture assembly (such as a track lighting fixture assembly 204, 206, or 208 in a track lighting system 200 in FIG. 2A or a recessed lighting fixture assembly 250 in FIG. 2B), a ceiling fan fixture assembly 260, or other electrical fixture that has an interchangeable element (e.g., a lamp, trim, fan blade, or heating element) that may impact the power usage of the electrical fixture. As shown in FIG. 2A, a track lighting fixture system 200 consistent with the present invention has a track terminal 202 and one or more track lighting fixture assemblies 204, 206, and 208 each of which may include a track head and trim (neither of which is shown in the figures). Each track lighting fixture assembly has a label 210, 212, or 214 adapted to be modified to enable the track lighting fixture assembly 204, 206, and 208 to comply to its assigned power usage limit upon installation in the respective branch circuit 112, 114, 116, or 118. In FIG. 2A, each label 210, 212, or 214 is shown disposed on an internal surface 216, 218, or 220 (in cut-away view) of the respective track lighting fixture assembly 204, 206, and 208. The internal surface 216, 218, or 220 may be viewed by a user through an open end 222, 224, or 226 of the respective track lighting fixture assembly 204, 206, and 208 so that a user may reference the label 210, 212, or 214 as modified by an installer to identify an interchangeable element (e.g., a lamp or trim) in compliance with the power usage limit assigned to the respective fixture assembly 204, 206, and 208 in accordance with the present invention. However, the label 210, 212, or 214 may also be disposed on an external surface 228, 230, or 232 of the respective track lighting fixture assembly 204, 206, and 208. In another embodiment, a label 240 may be disposed on the track terminal 202 so that a user may reference the label 240 as modified by an installer to identify an interchangeable element (e.g., a lamp or trim) in compliance with the power usage limit assigned to each fixture assembly 204, 206, and 208 in the track system 200.

Similarly, as shown in FIGS. 2B and 2C, a recessed lighting fixture assembly 250, a ceiling fan fixture assembly 260, or other electrical fixture assembly consistent with the present invention includes a label 252 or 262 adapted to be modified to enable the respective fixture 250 or 260 to comply to its assigned power usage limit upon installation in the respective branch circuit 112, 114, 116, or 118. Each label 252 or 262 may be disposed on an internal surface 254 or 264 visible through an open end 256 or 266 of the respective fixture assembly 250 or 260, or on an external surface 258 or 268 of the respective fixture assembly 250 or 260 so that a user may reference the label 252 or 262 to identify an interchangeable element (e.g., a lamp, trim, fan blade, or heating element) in compliance with the power usage limit assigned to the fixture assembly 250 or 260 in accordance with the present invention.

Figure 3:
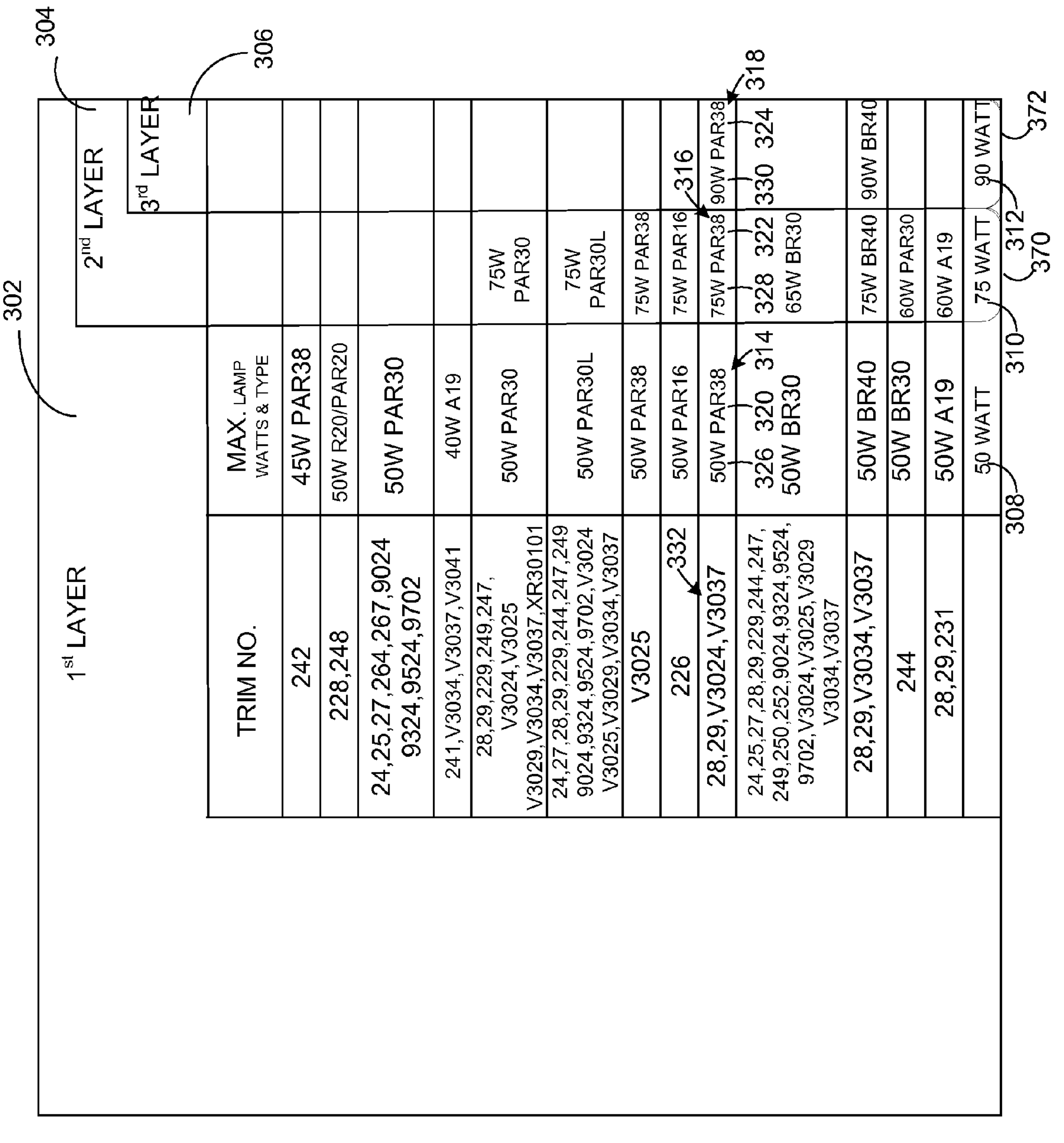
FIG. 3 depicts one embodiment of a label suitable for use with each of the electrical fixtures assemblies shown in FIGS. 1, 2A, 2B, and 2C to enable the respective fixture assembly to be modified to comply with a respective power usage limit in accordance with the present invention.

FIG. 3 depicts one embodiment 300 of the modifiable label 122*a*-122*n*, 124*a*-124*c*, 126*a*-126*c*, 128*a*-128*n*, 210, 212, 214, 252, or 262 suitable for use with each of the electrical fixture assemblies 102*a*-102*n*, 104*a*-104*c*, 106*a*-106*c*, 108*a*-108*n*, 200, 204, 206, 208, 250, or 260 in the electrical power distribution system 100. The label 300 is adapted to be applied to a surface 216, 218, 220, 228, 230, 232, 240, 254, 258, 264, or 268 of the electrical fixture assembly. The label 300 has a plurality of sections 302, 304, and 306 where each section 302, 304, and 306 identifies a respective one of a plurality of power usage limits 308, 310, and 312 (e.g., 50 Watt, 75 Watt, or 90 Watt) for operating the electrical fixture in a circuit, such as in a branch circuit 112, 114, 116, or 118 of an electrical power distribution circuit 100. At least one of the sections (e.g., section 304 or 306 or both) is adapted to be removed from the label 300 by an installer when the power usage limit identified by the respective section exceeds another power usage limit associated with or assigned to the electrical fixture 102*a*-102*n*, 104*a*-104*c*, 106*a*-106*c*, 108*a*-108*n*, 200, 204, 206, 208, 250, or 260 when installed in the circuit 112, 114, 116, or 118.

In the implementation shown in FIG. 3, each of the sections 302, 304, and 306 correspond to a respective layer of the label 300 disposed in an order or sequence in accordance with the power usage limit 308, 310, or 312 identified by each layer 302, 304, and 306. Each layer 302, 304, and 306 are formed such that the power usage limit 308, 310, or 312 identified by each layer 302, 304, and 306 is visible to a user viewing the label 300. In this implementation, a first 302 of the sections is adapted to be disposed on, printed on or applied to the surface 216, 218, 220, 228, 230, 232, 254, 258, 264, or 268 of the electrical fixture assembly 102*a*-102*n*, 104*a*-104*c*, 106*a*-106*c*, 108*a*-108*n*, 200, 204, 206, 208, 250, or 260. A second layer 304 is disposed over or removably affixed to a portion of the first layer 302. A third layer 306 may be disposed over or removably affixed to a portion of the second layer 304. Thus, each layer 304 and 306 of the label 300, except for the first or lowest layer 302, is adapted to be removed from the label 300 when the power usage limit identified by the respective section exceeds the power usage limit assigned to the electrical fixture 102*a*-102*n*, 104*a*-104*c*, 106*a*-106*c*, 108*a*-108*n*, 200, 204, 206, 208, 250, or 260 when installed in the circuit 112, 114, 116, or 118. In the example implementation shown in FIG. 3, if the label 300 is applied to an electrical fixture assembly (e.g., 102*a*) having an assigned power usage limit of 50 Watts when installed in a circuit (e.g., branch circuit 112), then an installer or user may reference the label 300 and remove each layer 304 and 306 identifying a respective power usage limit 310 or 312 (e.g., 75 Watt and 90 Watt, respectively) that exceeds the assigned power usage limit of 50 Watts. Thus, the label 300, when applied to an electrical fixture assembly 102*a*-102*n*, 104*a*-104*c*, 106*a*-106*c*, 108*a*-108*n*, 200, 204, 206, 208, 250, or 260 enables the electrical fixture assembly to comply with different power usage limits that may be assigned to the electrical fixture upon installation in a branch circuit 112, 114, 116, or 118 in accordance with state, local, or other applicable electrical or energy codes.

Returning to FIG. 3, each section or layer 302, 304, and 306 may also identify an interchangeable element 314, 316, and 318 (e.g., a lamp, trim, fan blade, or heating element) in association with the power usage limit 308, 310, or 312 identified by the respective section or layer 302, 304, or 306 to reflect that the interchangeable element 314, 316, and 318 is adapted to be used with an electrical fixture assembly 102*a*-102*n*, 104*a*-104*c*, 106*a*-106*c*, 108*a*-108*n*, 200, 204, 206, 208, 250, or 260 when the interchangeable element 314, 316, and 318 is operated in the electrical fixture in accordance with the power usage limit 308, 310, or 312 identified by the respective section or layer 302, 304, or 306.

In the implementation depicted in FIG. 3, the label 300 is suitable for use with a lighting fixture assembly 200 or 250. Each section layer 302, 304, and 306 of the label 300 identifies a respective lamp selection as the interchangeable element 314, 316, or 318 capable of being operated in the lighting fixture assembly 200 or 250 in accordance with the power usage limit 308, 310, or 312 identified by the respective section or layer 302, 304, and 306. Each lamp selection 314, 316, or 318 includes a lamp type 320, 322, or 324 and a corresponding power limit or wattage 326, 328, or 330.

The first section or layer 302 may also identify the first lamp selection or interchangeable element 314 in association with a trim type 332 to reflect that the trim type 332 is adapted to mate to and be used with the lighting fixture to which the label 300 is applied, when the first lamp selection 314 is operated in the lighting fixture in accordance with the power usage limit 308 identified by the first section or layer 302. In addition, the label 300 may be arranged such that the second section or layer 304 identifies the second lamp selection or interchangeable element 316 in association with the same trim type 332 to reflect that the trim type 332 is also adapted to mate to and be used with the lighting fixture when the second lamp selection 316 is operated in the lighting fixture in accordance with the power usage limit 310 identified by the second section or layer 304. Similarly, the third section or layer 306 may be disposed relative to the first layer 302 such that the third layer 302 identifies the third lamp selection or interchangeable element 318 in association with the same trim type 332 to reflect that the trim type 332 is also adapted to mate to and be used with the lighting fixture when the third lamp selection 318 is operated in the lighting fixture in accordance with the power usage limit 312 identified by the third layer 306.

Accordingly, each layer 302, 304, and 306 may identify respective lamp selection 314, 316, 318 and trim type 332 combinations for use with a light fixture assigned a power usage limit that is equal to or lower than the power usage limit 308, 310, or 312 identified by the respective layer 302, 304, and 306 of the label 300.

To assist in removal of a section 304 or 306 from the label 300, a bottom edge 370 or 372 of each of the removable sections 304 or 306 may be color coded and/or omit an adhesive backing to assist in the start of the removal process for the respective section 304 or 306 of the label 300.

FIG. 4 depicts another embodiment 400 of the modifiable label 102*a*-102*n*, 104*a*-104*c*, 106*a*-106*c*, 108*a*-108*n*, 210, 212, 214, 204, 206, 208, 250, or 260 suitable for use with each of the electrical fixture assemblies 102*a*-102*n*, 104*a*-104*c*, 106*a*-106*c*, 108*a*-108*n*, 200, 204, 206, 208, 250, or 260 in the electrical power distribution system 100. The label 400 is adapted to be applied to a surface 216, 218, 220, 228, 230, 232, 254, 258, 264, or 268 of the electrical fixture assembly. The label 400 has a plurality of sections 402, 404, and 406 where each section 402, 404, and 406 identifies a respective one of a plurality of power usage limits 408, 410, and 412 (e.g., 50 Watt, 75 Watt, or 90 Watt) for operating the electrical fixture in a circuit, such as in a branch circuit 112, 114, 116, or 118 of an electrical power distribution circuit 100. At least one of the sections (e.g., section 404 or 406 or both) is adapted to be removed from the label 400 when the power usage limit identified by the respective section exceeds another power usage limit associated with or assigned to the electrical fixture 102*a*-102*n*, 104*a*-104*c*, 106*a*-106*c*, 108*a*-108*n*, 200, 204, 206, 208, 250, or 260 when installed in the circuit 112, 114, 116, or 118.

As shown in FIG. 4, the sections 402, 404, and 406 of the label 400 are disposed in an order or sequence in accordance with the power usage limit 408, 410, or 412 identified by each section 402, 404, and 406. In one implementation, the power usage limit 408 identified by a first 402 of the sections is lower than the power usage limit 410 identified by a second section 404 adjacent the first section 402. Similarly, the power usage limit 410 identified by the second section 404 is lower than the power usage limit 412 of a next section 406 adjacent the second section 404. Each section 404 and 406 may be detachable from the adjacent preceding section 402 or 404 via perforations or creases formed between sections 402, 404, and 406 as reflected by the dashed lines 405 and 407 in FIG. 4.

At least the first section 402 is adapted to be disposed on or applied to the surface 216, 218, 220, 228, 230, 232, 254, 258, 264, or 268 of the electrical fixture assembly 102*a*-102*n*, 104*a*-104*c*, 106*a*-106*c*, 108*a*-108*n*, 200, 204, 206, 208, 250, or 260 such that each section 404 and 406 of the label 400, except for the first section 402, is adapted to be removed from the label 400 by an installer when the power usage limit identified by the respective section exceeds the power usage limit assigned to the electrical fixture 102*a*-102*n*, 104*a*-104*c*, 106*a*-106*c*, 108*a*-108*n*, 200, 204, 206, 208, 250, or 260 when installed in the circuit 112, 114, 116, or 118.

Each section 402, 404, and 406 may also identify an interchangeable element 414, 416, and 418 (e.g., a lamp, trim, fan blade, or heating element) in association with the power usage limit 408, 410, or 412 identified by the respective section 402, 404, or 406 to reflect that the interchangeable element 414, 416, and 418 is adapted to be used with an electrical fixture assembly 102*a*-102*n*, 104*a*-104*c*, 106*a*-106*c*, 108*a*-108*n*, 200, 252, or 262 when the interchangeable element 414, 416, and 418 is operated in the electrical fixture in accordance with the power usage limit 408, 410, or 412 identified by the respective section 402, 404, or 406.

Similar to the label 300 in FIG. 3, the label 400 depicted in FIG. 4 is suitable for use with a lighting fixture assembly 200 or 250. Each section 402, 404, and 406 of the label 400 identifies a respective lamp selection as the interchangeable element 414, 416, or 418 capable of being operated in the lighting fixture assembly 200 or 250 in accordance with the power usage limit 408, 410, or 412 identified by the respective section 402, 404, and 406. Each lamp selection 414, 416, or 418 includes a lamp type 420, 422, or 424 and a corresponding power limit or wattage 426, 428, or 430.

In one implementation, the first section 402 also identifies the first lamp selection or interchangeable element 414 in association with a trim type 432 to reflect that the trim type 432 is adapted to mate to and be used with the lighting fixture to which the label 400 is applied, when the first lamp selection 414 is operated in the lighting fixture in accordance with the power usage limit 408 identified by the first section 402. In addition, the label 400 may be arranged such that the second section 404 identifies the second lamp selection or interchangeable element 416 in association with the same trim type 432 to reflect that the trim type 432 is also adapted to mate to and be used with the lighting fixture when the second lamp selection 416 is operated in the lighting fixture in accordance with the power usage limit 410 identified by the second section 404. Similarly, the third section 406 may be disposed relative to the first section 402 such that the third section 406 identifies the third lamp selection or interchangeable element 418 in association with the same trim type 432 to reflect that the trim type 432 is also adapted to mate to and be used with the lighting fixture when the third lamp selection 418 is operated in the lighting fixture in accordance with the power usage limit 412 identified by the third section 406.

Accordingly, each section 402, 404, and 406 of the label 400 may identify respective lamp selection 414, 416, 418 and trim type 432 combinations for use with a light fixture assigned a power usage limit that is equal to or lower than the power usage limit 408, 410, or 412 identified by the respective sections 402, 404, and 406 of the label 400.

To assist in removal of a section 404 or 406 from the label, a bottom edge 470 and 472 of each of the removable sections 404 or 406 may be color coded and/or omit an adhesive backing to assist in the start of the removal process for the respective section 404 or 406 of the label 400.

Figure 5:
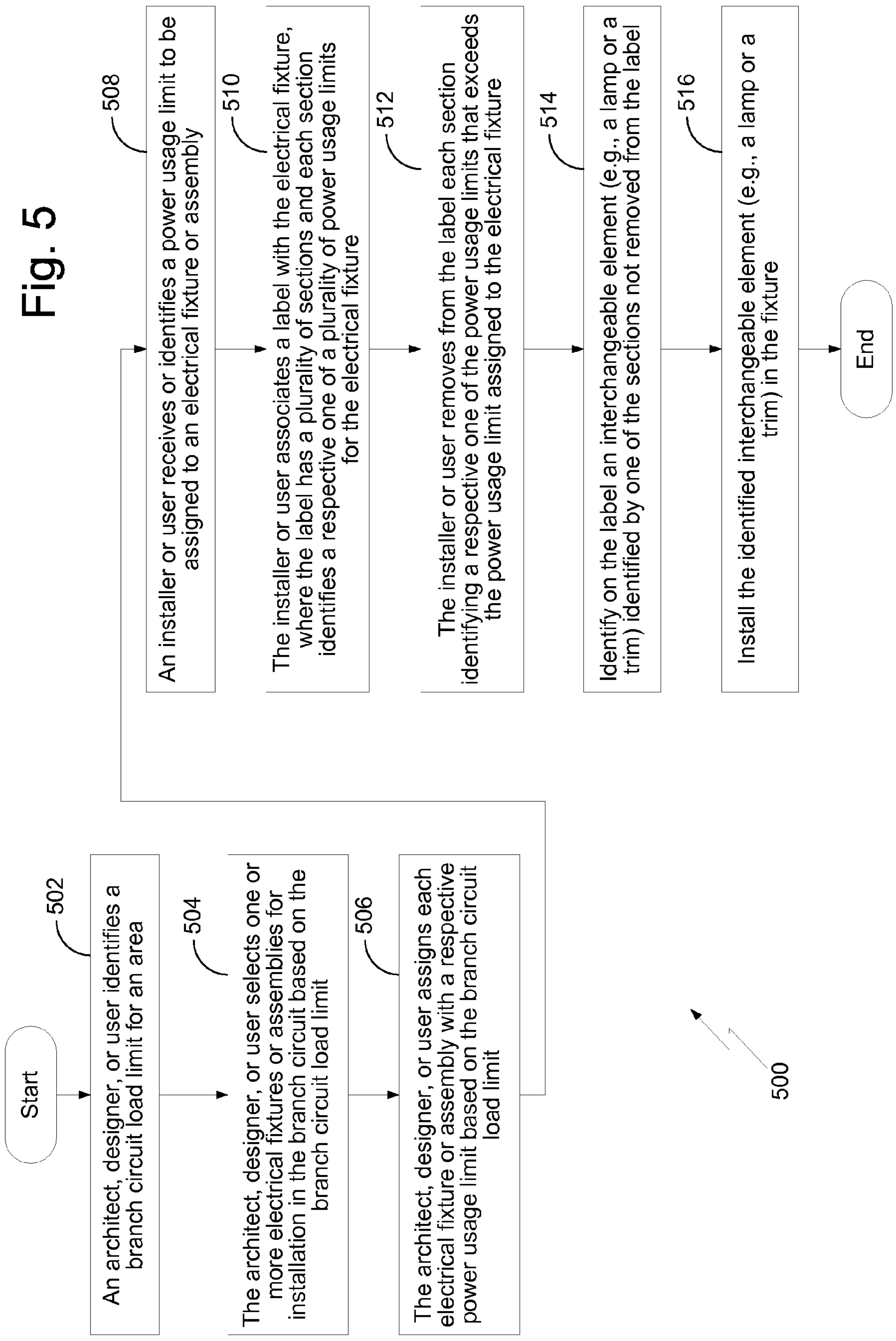
FIG. 5 depicts a process for modifying an electrical fixture to comply with a power usage limit assigned to the electrical fixture for operation in a circuit in accordance with the present invention.

FIG. 5 depicts a process or method 500 for designing a load for a circuit (e.g., branch circuit 112) using electrical fixtures adapted to be modified to comply with a respective power usage limit (e.g., 102*a*) and for modifying the electrical fixture to comply with the power usage limit assigned to the electrical fixture for operation in the circuit. Initially, an architect, designer, or user identifies a branch circuit load limit for an area (step 502). For example, a lighting designer for a commercial building may identify that the branch circuit 112 is to provide power for track lighting in a specific room of the commercial building. The designer is able to request or recognizes that the branch circuit 112 has a load limit of, for example, 70 Amps (or 8.4 Kilowatts assuming 120 VAC service) for powering the track lighting fixture or assemblies to be operated in the branch circuit 112. The designer then selects one or more electrical fixtures or assemblies 102*a*-102*n* for installation in the branch circuit 112 based on the identified branch circuit load limit (step 504). To comply with applicable electrical codes and/or energy codes, the designer assigns each electrical fixture or assembly 102*a*-102*n* with a respective power usage limit based on the identified branch circuit load limit (step 506). For example, assuming the designer wanted to utilize 168 track lighting fixture assemblies 204, 206, and 208, the designer assigns each of the track lighting fixture assemblies 204, 206, and 208 to be installed in the branch circuit 112 a power usage limit of 50 Watts (i.e., 8.4 Kilowatts/168=50 Watts).

Subsequently, an installer or user receives or identifies the power usage limit to be assigned to an electrical fixture or assembly 102*a* (step 508) to be installed in the branch circuit 112. For example, the designer of the lighting in the commercial building having the branch circuit 112 may identify the planned track lighting fixture assemblies 102*a*-102*n* to be installed on the branch circuit 112 to the installer or user along with the corresponding power usage limit assigned to each lighting fixture assembly 102*a*-102*n* via a lighting layout plan or list (not shown in the figures). The installer or user then associates a label 300 or 400 with the electrical fixture 102*a*, where the label 300 or 400 has a plurality of sections 302, 304, 306 or 402, 404, 406 and each section identifies a respective one of a plurality of power usage limits 308, 310, 312 or 408, 410, 412 for the electrical fixture 102*a* (step 510). The label 300 or 400 may be provided with the electrical fixture 102*a* or applied during manufacturing to a surface 216, 218, 220, 228, 230, 232, 254, 258, 264, or 268 of the fixture 102*a* visible by the installer or user. Next, the installer or user removes from the label 300 or 400 each section identifying a respective one of the power usage limits 308, 310, 312 or 408, 410, 412 that exceeds the power usage limit assigned to the electrical fixture 102*a* (step 512). The installer or user may then identify on the label an interchangeable element 314, 316, 318, 332, 414, 416, 418, or 432 (e.g., a lamp or a trim) identified by one of the sections not removed from the label 300 or 400 (step 514). Finally, the installer or user may install the identified interchangeable element 314, 316, 318, 332, 414, 416, 418, or 432 in the electrical fixture (step 516). By performing process 500, an installer or user may substantially increase the likelihood that an electrical inspector will approve of the installation of the electrical fixture without requiring a new label for the electrical fixture governing the interchangeable elements of the electrical fixture to the power usage level assigned to the fixture.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An electrical fixture assembly, comprising:

an electrical fixture having a surface; and a label adapted to be applied to the surface, the label having a plurality of sections, each section identifying a respective one of a plurality of power usage limits for operating the electrical fixture in a circuit;

wherein at least one of the sections is adapted to be manually removed from the label when the power usage limit identified by the at least one of the sections exceeds another power usage limit associated with the electrical fixture when installed in the circuit.

2. An electrical fixture assembly, comprising:

an electrical fixture having a surface; and a label adapted to be applied to the surface, the label having a plurality of sections, each section identifying a respective one of a plurality of power usage limits for operating the electrical fixture in a circuit;

wherein at least one of the sections is adapted to be removed from the label when the power usage limit identified by the at least one of the sections exceeds another power usage limit associated with the electrical fixture when installed in the circuit; and wherein the electrical fixture is a lighting fixture, a first section identifies a first lamp selection capable of being operated in the lighting fixture in accordance with the power usage limit identified by the first section, and a second section identifies a second lamp selection capable of being operated in the lighting fixture in accordance with the power usage limit identified by the second section.

3. The electrical fixture assembly of claim 2, wherein the label is visible to a user when the label is applied to the surface and the electrical fixture assembly is installed in the circuit.

4. The electrical fixture assembly of claim 2, wherein, after the label is applied to the surface, each section except a first of the sections is adapted to be removed from the label.

5. The electrical fixture assembly of claim 2, wherein a first of the sections corresponds to a first layer disposed on the surface and each of the at least one of the sections adapted to be removed from the label corresponds to a respective layer disposed over the first layer.

6. The electrical fixture assembly of claim 2, wherein the plurality of sections are disposed in an order in accordance with each power usage limit identified by each section.

7. The electrical fixture assembly of claim 6, wherein the power usage limit identified by a first of the sections is lower than the power usage limit identified by a second of the sections adjacent the first, and the second section is detachable from the first section.

8. The electrical fixture assembly of claim 2, wherein the first section identifies the first lamp selection in association with a trim type to reflect that the trim type is adapted to mate to and be used with the lighting fixture when the first lamp selection is operated in the lighting fixture in accordance with the power usage limit identified by the first section, and the second section identifies the second lamp selection in association with the trim type to reflect that the trim type is adapted to mate to and be used with the lighting fixture when the second lamp selection is operated in the lighting fixture in accordance with the power usage limit identified by the second section.

9. A method for modifying an electrical fixture to comply with a power usage limit assigned to the electrical fixture for operation in a circuit, the method comprising:

associating a label with an electrical fixture, the label having a plurality of sections, each section identifying a respective one of a plurality of power usage limits for the lighting fixture; and manually removing from the label each section identifying a respective one of the power usage limits that exceeds the power usage limit assigned to the electrical fixture.

10. A method for modifying an electrical fixture to comply with a power usage limit assigned to the electrical fixture for operation in a circuit, the method comprising:

associating a label with an electrical fixture, the label having a plurality of sections, each section identifying a respective one of a plurality of power usage limits for the lighting fixture; and removing from the label each section identifying a respective one of the power usage limits that exceeds the power usage limit assigned to the electrical fixture; and wherein the electrical fixture is a lighting fixture, a first of the sections identifies a first lamp selection capable of being operated in the lighting fixture in accordance with the power usage limit identified by the first section and a second section identifies a second lamp selection capable of being operated in the lighting fixture in accordance with the power usage limit identified by the second section.

11. The method of claim 10, wherein associating a label with the electrical fixture comprises applying the label to a surface of the fixture visible by a user after the fixture is installed in the circuit.

12. The method of claim 10, each section except a first of the sections is adapted to be removed from the label.

13. The method of claim 10, wherein a first of the sections corresponds to a first layer disposed on the surface and a second of the sections corresponds to a second layer disposed over and removably affixed to the first layer.

14. The method of claim 10, wherein the plurality of sections are disposed in an order in accordance with each power usage limit identified by each section.

15. The method of claim 14, wherein the power usage limit identified by a first of the sections is lower than the power usage limit identified by a second of the sections adjacent the first, and the second section is detachable from the first section.

16. The method of claim 10, wherein the first section identifies the first lamp selection in association with a trim type to reflect that the trim type is adapted to mate to and be used with the lighting fixture when the first lamp selection is operated in the lighting fixture in accordance with the power usage limit identified by the first section, and the second section identifies the second lamp selection in association with the trim type to reflect that the trim type is adapted to mate to and be used with the lighting fixture when the second lamp selection is operated in the lighting fixture in accordance with the power usage limit identified by the second section.

17. A lighting fixture assembly, comprising:

a lighting fixture having a surface; and a label adapted to be applied to the surface, the label having a plurality of sections, each section identifying a respective one of a plurality of power usage limits for operating the lighting fixture in a circuit;

wherein each section except for a first section is adapted to be manually removed from the label when the power usage limit identified by the respective section exceeds another power usage limit associated with the lighting fixture when installed in the circuit.

18. The lighting fixture assembly of claim 17, wherein the label is visible to a user when the label is applied to the surface and the lighting fixture assembly is installed in the circuit.

* * * * *

UNITED STATES PATENT AND TRADEMARK OFFICE

CERTIFICATE OF CORRECTION

PATENT NO. : 7,581,843 B2 
APPLICATION NO. : 11/421906
DATED : September 1, 2009
INVENTOR(S) : Joseph Stauner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Fourteenth Day of September, 2010

David J. Kappos

*Director of the United States Patent and Trademark Office*